US007624070B2

(12) United States Patent
Lebouitz

(10) Patent No.: US 7,624,070 B2
(45) Date of Patent: Nov. 24, 2009

(54) OPEN PAYMENTS TARGET MARKETING SYSTEM

(76) Inventor: Martin Frederick Lebouitz, 814 S. Bayside Dr., Tampa, FL (US) 33609

( * ) Notice: Subject to any disclaimer, the term of this patent is extended or adjusted under 35 U.S.C. 154(b) by 222 days.

(21) Appl. No.: 11/512,011

(22) Filed: Aug. 29, 2006

(65) Prior Publication Data

US 2007/0239598 A1    Oct. 11, 2007

(51) Int. Cl.
*G06Q 40/00* (2006.01)
(52) U.S. Cl. ........................................... 705/39
(58) Field of Classification Search .............. 705/39
See application file for complete search history.

(56) References Cited

U.S. PATENT DOCUMENTS 6,076,074 A * 6/2000 Cotton et al. ................. 705/40

2006/0229896 A1 * 10/2006 Rosen et al. .................. 705/1

OTHER PUBLICATIONS

Hp.com, "Open Payments Target Marketing System" Oct. 2005.*

* cited by examiner

*Primary Examiner*—Kambiz Abdi
*Assistant Examiner*—Lindsay M. Maguire
(74) *Attorney, Agent, or Firm*—Grimes & Battersby LLP; James F McLaughlin

(57) ABSTRACT

A system and method is provided by which banks implement an automated process to identify and analyze payment related information, and, more particularly, to such a system and method requiring an identification of incoming payments correspondent banks route through competitors; the capture of information, including the correspondent bank the payment originated from, the competitor the payment was sent through, the account party (correspondent bank's customer), the payment beneficiary (customer), and payment ID information (reference numbers, date and amount) associated with such payments; the generation of an advisory message to the correspondent bank that payment can be made directly from their account (book transfer) and the generation of a report to correspondent banks identifying indirectly routed payments for the month.

9 Claims, 10 Drawing Sheets

Sizing Business Opportunities & Threats

Customer Information File Based Analysis
CIF Hierarchy to roll-up opportunities to Ultimate parent
CIF Hierarchy to ID subsidiaries of Regents UK customers
CRM data to ID which companies Regents has called on Identify Sending Institutions who are not our customers but would be good candidates to be our customer.

How big is the wallet of our correspondent and what percentage of their business does it appear that we are getting.

Identify significantly decreased volume to our bank from a specific sending institution while our correspondent banks are not seeing similar reductions in volume.

OPEN PAYMENTS TARGET MARKETING SYSTEM

BACKGROUND OF THE INVENTION

1. Field of the Invention

The present invention relates generally to a system and method by which banks implement an automated process to identify and analyze payment related information, and, more particularly, to such a system and method requiring an identification of incoming payments correspondent banks route through competitors; the capture of information, including the correspondent bank the payment originated from, the competitor the payment was sent through, the account party (correspondent bank's customer), the payment beneficiary (customer), and payment ID information (reference numbers, date and amount) associated with such payments; the generation of an advisory message to the correspondent bank that payment can be made directly from their account (book transfer) and the generation of a report to correspondent identifying indirectly routed payments for the month.

2. Description of the Prior Art

Electronic and online banking has long been known in the prior art, from the transfer of moneys between banks and other institutions to the ability of an individual to monitor and control his or her accounts via a secure Internet website.

It should be appreciated that in today's world of electronic commerce, a bank's payments business forms an extensive "network" that extends well beyond its customers. Incoming and outdoing payment flows touch a bank's customers, it's customers doing business with other customers, correspondent banks directly and on behalf of its customers and their customers, its customers' transactions to their customers with accounts at other banks, and even its customers' transactions from their customers with accounts at other banks. The present invention recognizes that each of these payment flows gives rise to other opportunities to capture additional payment volumes through the data mining of existing payments information.

There exists a significant opportunity for banks to increase the volume of high-value payments they receive, thereby generating additional revenues by creatively using information they already have available. The present invention is directed to a process whereby a user can leverage its correspondent bank network and corporate customer base to: (1) capture high-value payments that are now going to its competitors; (2) extend its business to its customers' customers; (3) size its correspondent banks' payments wallet; (4) allocate reciprocity based on correspondent banks wallet share; and (5) develop an "early warning system" to detect threshold shifts in payments business.

As shall be appreciated, the prior art fails to specifically address either the problem or the solution arrived upon by applicant.

SUMMARY OF THE INVENTION

It is a primary object of the present invention to provide a system and method by which banks implement an automated process to identify and analyze payment related information and act upon said information on a real-time or near real-time basis.

It is another object of the present invention to provide such a system and method to identify potential new correspondent bank customers who have a significant volume of payment activity between that bank's customer and the user's customers. The pattern of activity will identify the top prospects based on volume of payments as well as trend in payment volumes and will also identify specific customer patterns that are driving existing volumes and trends in volume.

It is another object of the present invention to provide such a system and method that provides the user with an in-depth understanding of the user's patterns of business and the opportunities they give rise to.

It is still another object of the present invention to provide such a system and method that allows a user to capture high-value payments that are now going to the user's competitors.

It is but another object of the present invention to provide such a system and method that allows a user to extend the user's business to the user's customers' customers.

It is yet still another object of the present invention to provide such a system and method that allows a user to size the user's correspondent banks' payments wallet and allocate reciprocity based on correspondent bank wallet share.

It is another object of the present invention to provide such a system and method that allows a user to develop an "early warning system" to detect threshold shifts in payments business.

It is yet another object of the present invention to provide such a system and method that can significantly increase a user's high-value payments business by allowing the user to use the information the user currently has at the user's bank to work smarter.

It is but another object of the present invention to provide such a system and method that can easily be customized to meet the user's needs.

It is still another object of the present invention to provide such a system and method that is based on a readily available and existing framework, such as HP's Open Payments solution framework using technology such as HP Real Time Financial Services (RTFS) and HP OpenView BPI.

It is another object of the present invention to provide such a system and method that estimates wallet size of correspondent bank's payments relative shares by competitors versus the user's.

It is yet a further object of the present invention to provide such a system and method for identifying customer relationships at risk of significantly declining volumes or lost relationship.

It is yet another object of the present invention to provide such a system and method that identifies how much business a user is giving it's correspondent bank in relation to the trend in business they are giving the user versus their competitors.

It is a further object of the present invention to provide such a system and method that identifies how a correspondent bank, who has a relation with a user, is instead sending a payment to the user's customer through an intermediary bank who is the user's competitor.

It is also an object of the present invention to provide such a system and method for estimating wallet size of customer payments relative shares by competitors versus a user.

It is another object of the present invention to provide such a system and method that identifies customers who are transferring large amounts of funds to investment vehicles outside the bank and leaving a low overnight balance for investment opportunities to retain funds in the bank overnight.

It is a further object of the present invention to provide such a system and method for identifying potential new customers who have a significant volume of payment activity between a user's customers within the Eurozone but not the home country of the bank, which pattern will identify the top prospects based on volume of payments and to show top Customer to Beneficiary pairs.

It is also an object of the present invention to provide such a system and method that identifies potential new customers or existing customers who have a significant volume of payment activity in one currency but not in another.

It is another object of the present invention to provide such a system and method that identifies potential new customers who have a significant volume of payment activity from existing customers so as to identify the top prospects based on volume of payments.

It is still another object of the present invention to provide such a system and method that identifies patterns of conduct from a customer which may be suspicious when looking at inbound on-us transfers, outbound on-us transfers, inbound not on-us transfer and outbound not on-us transfers.

It is yet another object of the present invention to provide such a system and method that allows a user to enlarge its business footprint in the euro-zone.

It is another object of the present invention to provide such a system and method that allows conversion of corporate prospects to a user's customers to bring broad relationship benefits in addition to payments—including investment management, corporate finance, commercial lending, and investment banking.

It is but another object of the present invention to provide such a system and method that will identify and prioritize opportunities and provide the actionable information to develop successful offers to convert candidate companies to becoming a user's customers.

To the accomplishments of the foregoing objects and advantages, the present invention, in brief summary comprises a system and method by which banks implement an automated process to identify and analyze payment related information, and, more particularly, to such a system and method requiring an identification of incoming payments correspondent banks route through competitors; the capture of information, including the correspondent bank the payment originated from, the competitor the payment was sent through, the account party (correspondent bank's customer), the payment beneficiary (customer), and payment ID information (reference numbers, date and amount) associated with such payments; the generation of an advisory message to the correspondent bank that payment can be made directly from their account (book transfer) and the generation of a report to correspondent banks identifying indirectly routed payments for the month.

DETAILED DESCRIPTION OF THE PREFERRED EMBODIMENTS

Figure 1:
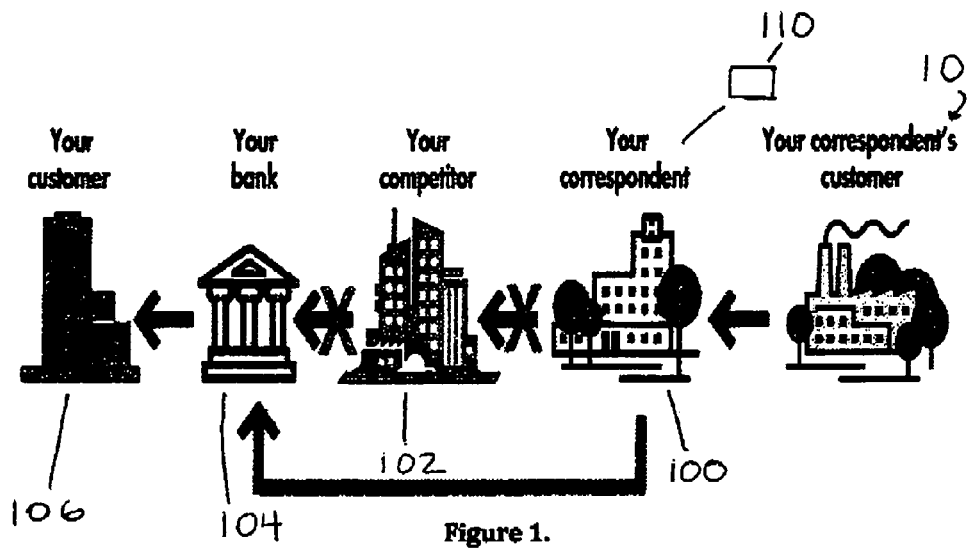
FIG. 1 is schematic diagram showing the indirect payment routing of the banking system and method of the present invention.

Referring to the drawings and, in particular, to FIG. 1 thereof, the open payments target marketing system of the present is provided and is referred to generally by reference numeral 10. The system 10 comprises a solution framework that improves a bank's ability to perform enterprise-wide and real-time functions. In particular, it uses technology such as HP's Real Time Financial Services (RTFS) or HP partners to create this capability. Another key component of the Open Payments Target Marketing System is the HP OpenView Business Process Intelligence (OpenView BPI) application. This technology captures real-time and near-real-time information from your payments systems and back-end systems.

Briefly, HP OpenView BPI technology consists of "artificial probes" that can be placed in any system to capture information, without the requirement to make changes to existing systems. HP OpenView BPI does not impact system performance and captures information in real time, which features are critical for the successful use and operation of the present invention. HP OpenView BPI incorporates visual display tools, such as gauges, and an analytics engine. Data can reside in a data store, which can refresh information to a historical database. OpenView BPI works with industry-standard database systems.

"Indirect payments" are incoming payments that a user's cobanks 100 route through its competitors 102, which then send the payments to the user 104 for credit to the user's customers 106. The user's correspondent banks 100, and their customers, will gain significant benefits by sending these payments directly to the user's correspondent bank. Referring to FIG. 1, an indirect payment routing is shown, which routing illustrates the goals of the open payments target marketing system: to eliminate the intermediary correspondent bank (the user's competitor) 102 and have the user's correspondent bank 100 send the payment directly to the user 104.

The benefits to the user's correspondent banks of eliminating this intermediary step include:

Lower charges for a single transaction as a book transfer

Figure 2:
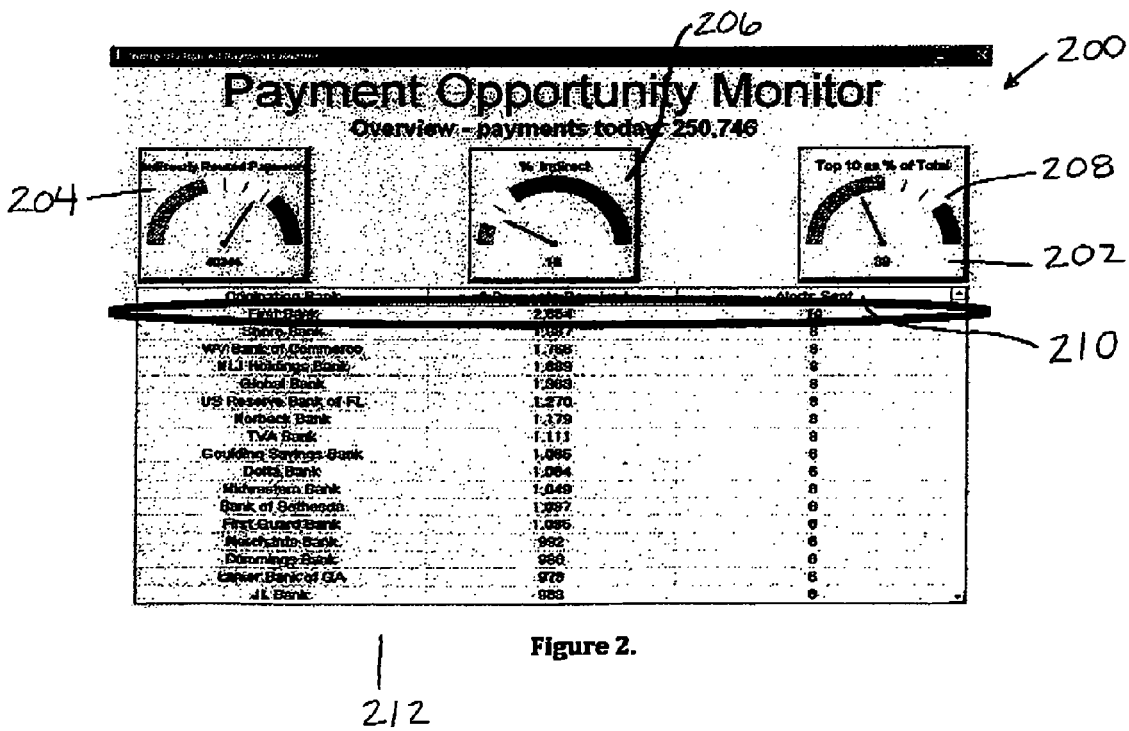
FIG. 2 is an illustration of the Payment Opportunity Monitor of the banking system and method of the present invention.

Reduced errors and a higher straight through processing (STP) rate, which results from eliminating unnecessary intermediary bank 110s and payment systems Reduced complexity for inquiries and investigations Faster posting of funds to the beneficiaries 108' accounts Extended cut-off times for book transfers Enhanced liquidity management Referring now to screen shown in FIG. 2, the Payment Opportunity Monitor 200 of the present invention is illustrated. The Payment Opportunity Monitor 200 provides an overview of indirect payments received. The gauges 202 at the top of the figure provide an indication of the size of the opportunity for capturing indirect payments. Once the Open Payments Target Marketing System 10 is initiated, these gauges 202 are used to monitor the success of your program to convert these indirect payments to book transfers.

The top-left gauge 202 is the Indirect Routed Payments Gauge 204 which shows the number of indirect payments received in real time. This is the size of the opportunity for converting indirect payments to book transfers. It should be appreciated that additional gauges 202 or metrics may easily be developed to track success rate over time against program goals. The center gauge at the top of FIG. 2 is the Percentage Indirect Gauge 206, which shows indirect payments as a percentage of total payments. This gauge 202 presents the size of the opportunity relative to total payment volume. Finally, the gauge 202 on the top right of the Monitor 200 is the Top Ten as Percentage of Total Gauge 208, which shows the concentration of indirect payments among correspondent banks 100. This gauge 202 shows how focused the opportunity is. This screen will identify major opportunities and help target business development activities.

The three columns below the gauges 202 show correspondent banks 100 ranging from those representing the highest to the lowest opportunity. For example, First Bank accounts for 2,654 of the 40,344 indirect payments received so far. Alerts Sent 210, shown in the right column of the Monitor 200, indicates how many alerts have been sent to the correspondent banks 100 to notify them that these payments should be directly routed to the user's bank 104. In FIG. 2, the reason the number of alerts is low relative to the number of indirect payments is largely due to the need for only one notification for a "customer pair" 212 payment that represents a pattern of payments on behalf of one of its customers 100 to one of the user's customers 106. Therefore, the number of alerts will be relatively lower if the customer pair 212 payment concentration is high.

Figure 3:
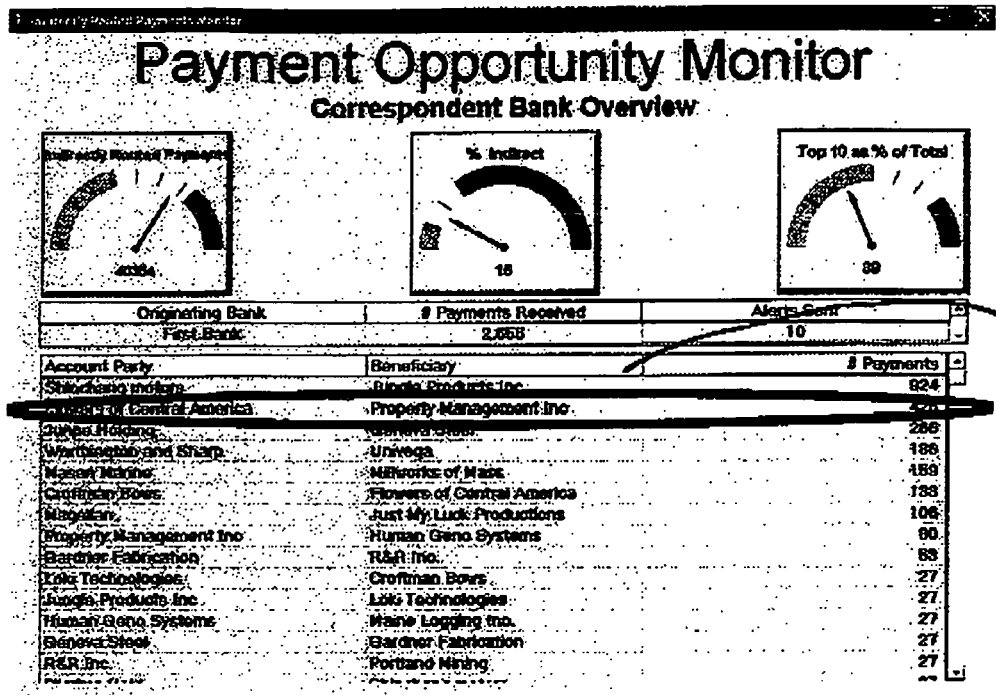
FIG. 3 is an illustration of the Correspondent Bank Overview "drill down" of the Payment Opportunity Monitor of the banking system and method of the present invention.

FIG. 3 shows the Correspondent Bank Overview "drill down" 214 which illustrates in more detail the indirect payments being initiated by one of the correspondent banks 100, in this example, First Bank. As can be seen, the same gauges that appear in the Payment Opportunity Monitor 200 of FIG. 2 continue to provide a real-time overview of the indirect payment situation. In this "drill down" 214, the columns below the gauges 202 show the customer pairs 212 involved in the indirect payments from First Bank. Each of First Bank's customers, which are making payments to the user's customers 106, are shown in the first column. The second column shows each of the beneficiaries 108 that are the user's customers 106.

As the second row in the list shows, First Bank's customer, Flowers of Central America, has sent 426 payments to Property Management, Inc. This information can be used to work the opportunity from two sides—through First Bank and through Property Management—to keep these payments within the user's bank 104. It should be appreciated that the top eight customer pairs 212 provide the bulk of the major opportunities—and this screen will help to focus efforts on these top opportunities.

Figure 4:
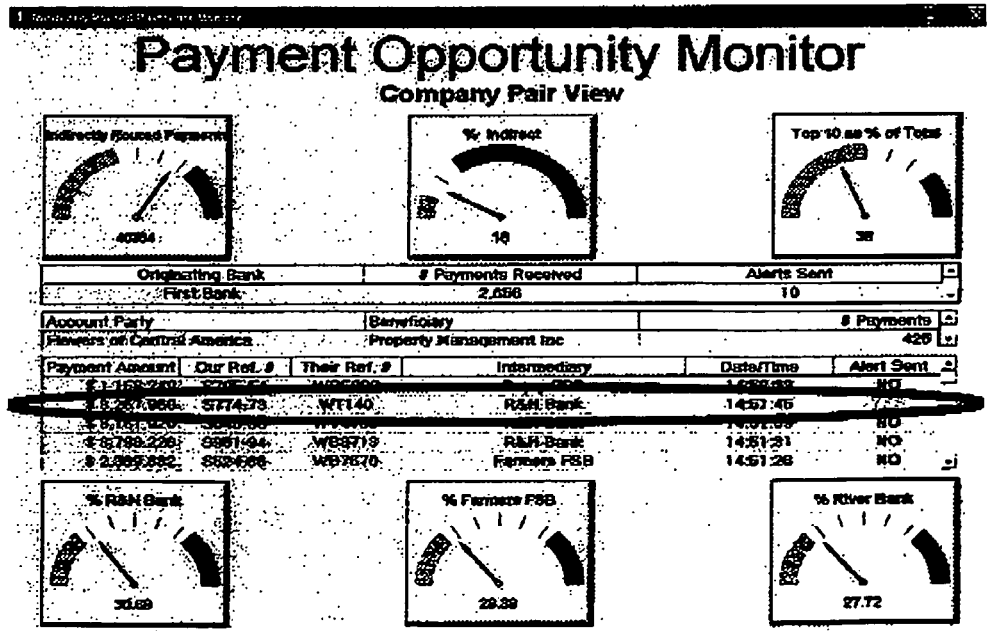
FIG. 4 is an illustration of the Customer Pair Overview Screen of the Payment Opportunity Monitor of the banking system and method of the present invention.

Illustrated in FIG. 4 is the Customer Pair Overview screen 216 which illustrates the detail of each of First Bank's transactions that are going from Flowers of Central America to Property Management, a user's customer 106. The fourth column in the Figure shows the intermediary bank 110 (the user's competitor 102)—which the user wishes to eliminate from the payment process so that the user can capture these transactions as book transfers. The gauges 202 at the bottom of FIG. 4 show the concentration of First Bank's indirect payments for the top intermediary bank 110s. These are the banks from which the user desires to obtain their business. In this example, R&H Bank has the top concentration of all indirect payments at 30 percent.

Figure 5:
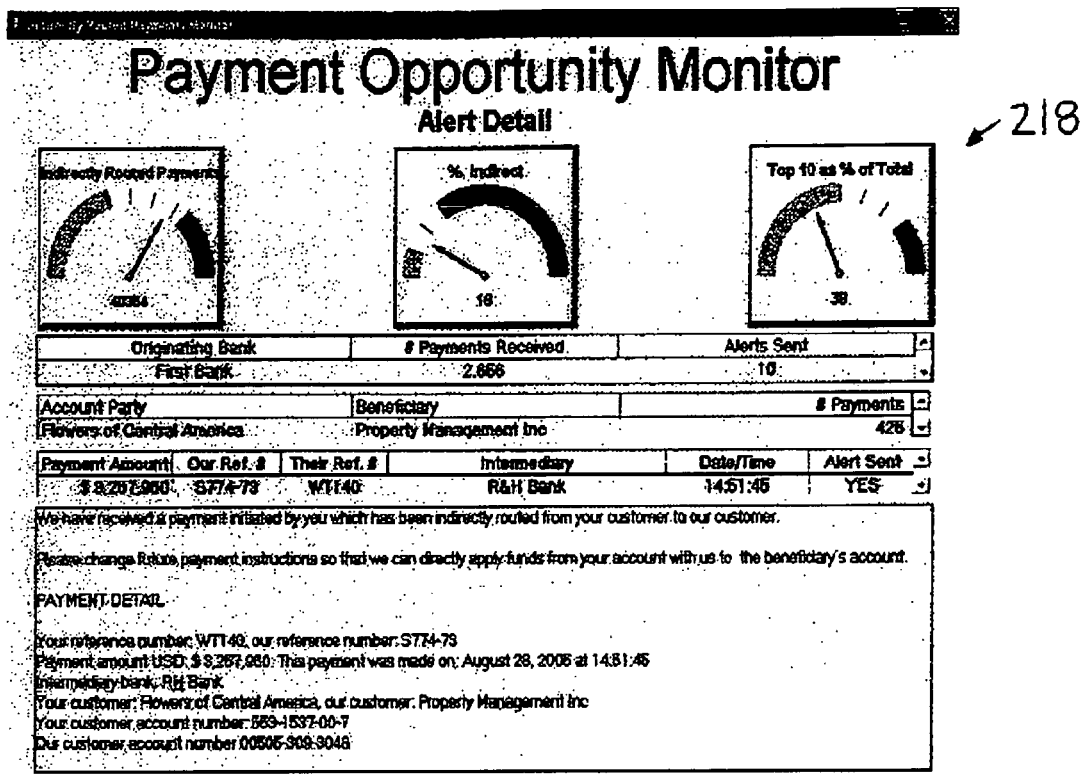
FIG. 5 is an illustration of the Alert Detail of the Payment Opportunity Monitor of the banking system and method of the present invention.

FIG. 5 is an illustration of the Alert Detail 218 which the user's bank 104 would send to First Bank—advising it of the opportunity to directly route the payment from its customer, Flowers of Central America, directly to user's customer 106, Property Management. The system 10 tracks alerts 218 against progress made in getting these indirect payments converted to the user's book transfers in line with the user's program goals. This data can be automatically transferred to any managing information (MIS) application, such as Microsoft® Excel, to track performance indicators.

Figure 6:
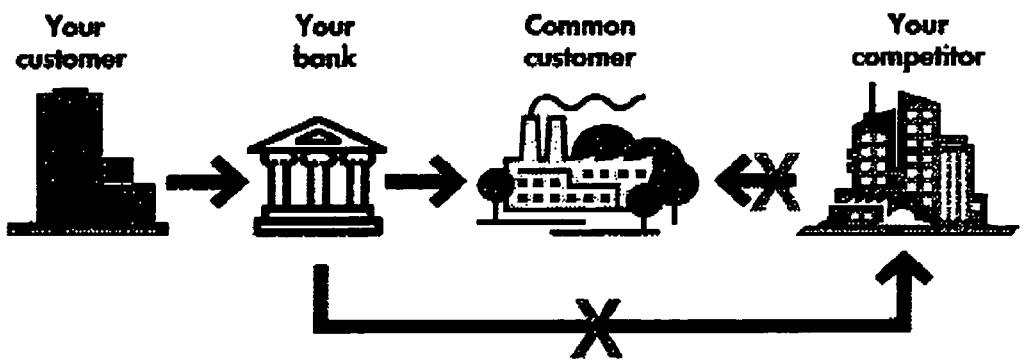
FIG. 6 is schematic diagram showing the skipped payment that is the target of the banking system and method of the present invention.

FIG. 6 is a schematic of the Open Payments Target Marketing System 10 of the present invention illustrating the ultimate objective of eliminating a user's customer's 106 payments to competitors 102 by keeping customer-to-customer payments on the user's books. Such payments, referred to as skipped payments, are payments made by the user's customers 106 to the user's customers 106—but through another bank 102. In other words, some of the user's customers 106 have accounts with competitor banks 102 and payments from the customers 106 are going to these competitor accounts 102 instead of being made on the user's books.

In some cases, the user's customers 106 may not know that their customers—the beneficiaries 108 of the payment—have an account with the user's bank 104. In other cases, when the user's customer 106 is the account party, they may be using routing instructions that were issued before their beneficiary 108 opened an account with the user's bank 104. These transactions all represent potential revenue leakage and business directed through the user's competitor 102 that could be kept in house.

There are compelling advantages for the user's customers 106 to send payments to their customers 106 directly to their accounts with the user's bank 104. These advantages include:

Lower charges for a single transaction and a book transfer

Figure 7:
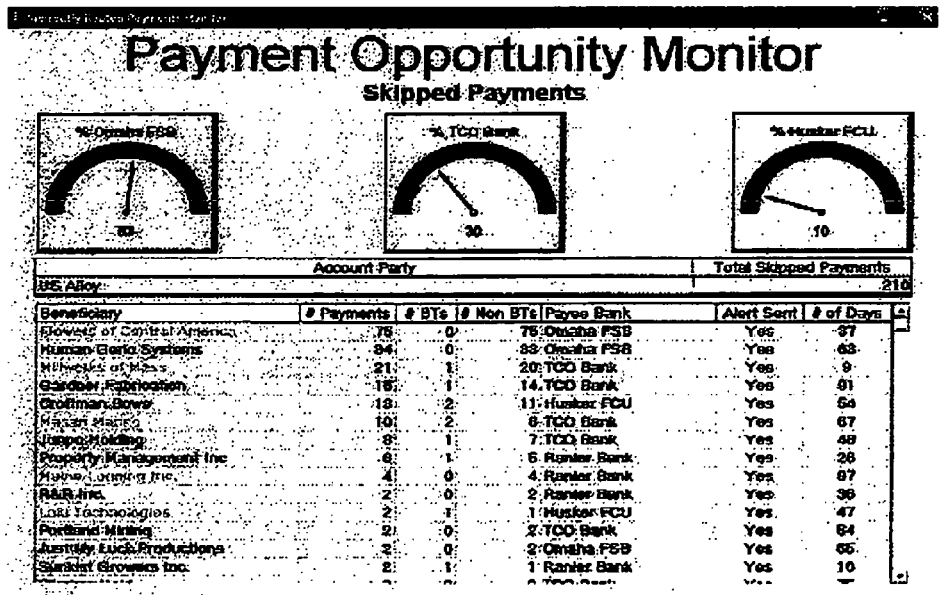
FIG. 7 is an illustration of the Skipped Payments Screen of the Payment Opportunity Monitor of the banking system and method of the present invention.

Reduced errors and a higher STP rate, resulting from eliminating unnecessary intermediary bank 110s and payment systems Reduced complexity for inquiries and investigations Faster posting of funds to the beneficiaries 108 account Extended cut-off times for book transfers Enhanced liquidity management FIG. 7 illustrates the Skipped Payments screen which shows the user's customer, US Alloy, and all of the beneficiaries 108 that are the user's customers 106 that US Alloy directs payments to. The top of the figure shows the concentration of US Alloy's skipped payments by intermediary bank 110. In this example, US Alloy sent 75 payments to the user's customer 106, Flowers of Central America. All of these payments were made to Flowers of Central America's account with TCO Bank. Therefore, there is an opportunity to convert all 75 of these payments to book transfers. Through the alert process in the Open Payments Target Marketing System 10, the user 104 can get US Alloy to agree that all of its payments to Flowers of Central America will occur via book transfer. In this case, the user 104 can use the user's auto-repair capability to change US Alloy's payments to book transfers. Flowers of Central America appears in green type in the Figure, indicating that the user 104 has already obtained US Alloy's permission to work with Flowers of Central America to get its payment instructions changed.

The right-most column in FIG. 7 shows the number of days since the user's alert 218 was sent for each of the skipped payment patterns. The company names on the left-most column in green type indicate that US Alloy has authorized the user 104 to contact its beneficiary 108 and that arrangements have been made to convert these external payments to book transfers. Red type in the figure indicates that there has not been a response to the alert 218; and black type indicates US Alloy does not want its existing payment arrangements changed.

Figure 8:
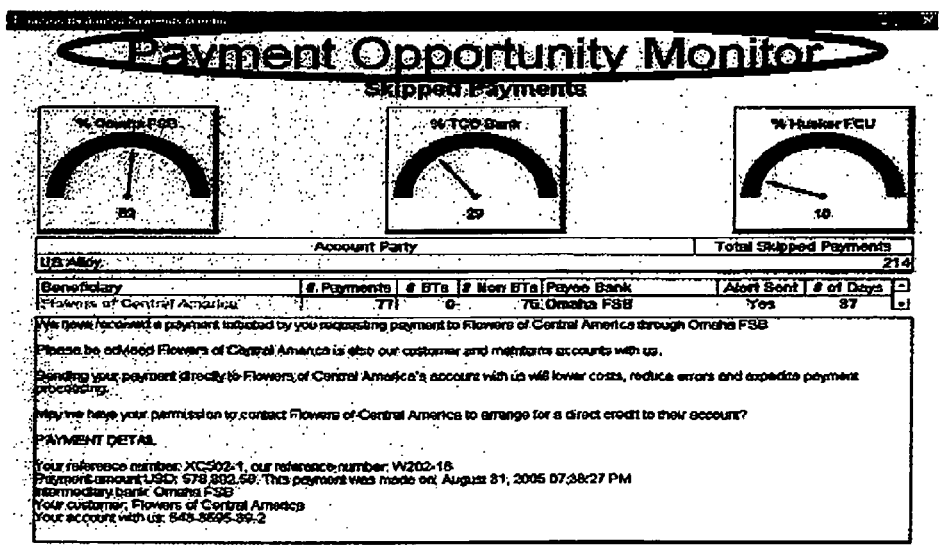
FIG. 8 is an illustration of the Skipped Payments Alert of the Payment Opportunity Monitor of the banking system and method of the present invention.

FIG. 8 shows the Skipped Payment screen 220 of the Open Payment Target Marketing System 10. This alert 218 requests US Alloy's permission to contact Flowers of Central America to arrange for direct credit of US Alloy's payments to Flowers of Central America's account with the user's bank 104. At the same time, the user's 104 Open Payments Target Marketing System 10 would identify the other skipped payment opportunities that US Alloy is making to all of the user's other customers 106. This intelligence would provide an excellent opportunity to discuss crediting these payments directly as well.

The user 104 can use information from the user's customer base to identify highly qualified new payment customers using the instant system 10. If the user's customers 106 are sending a large volume of payments to companies at the user's competitor banks 102, these companies are ideal prospects for discussing the advantages of opening an account with the user's bank 104.

Figure 9:
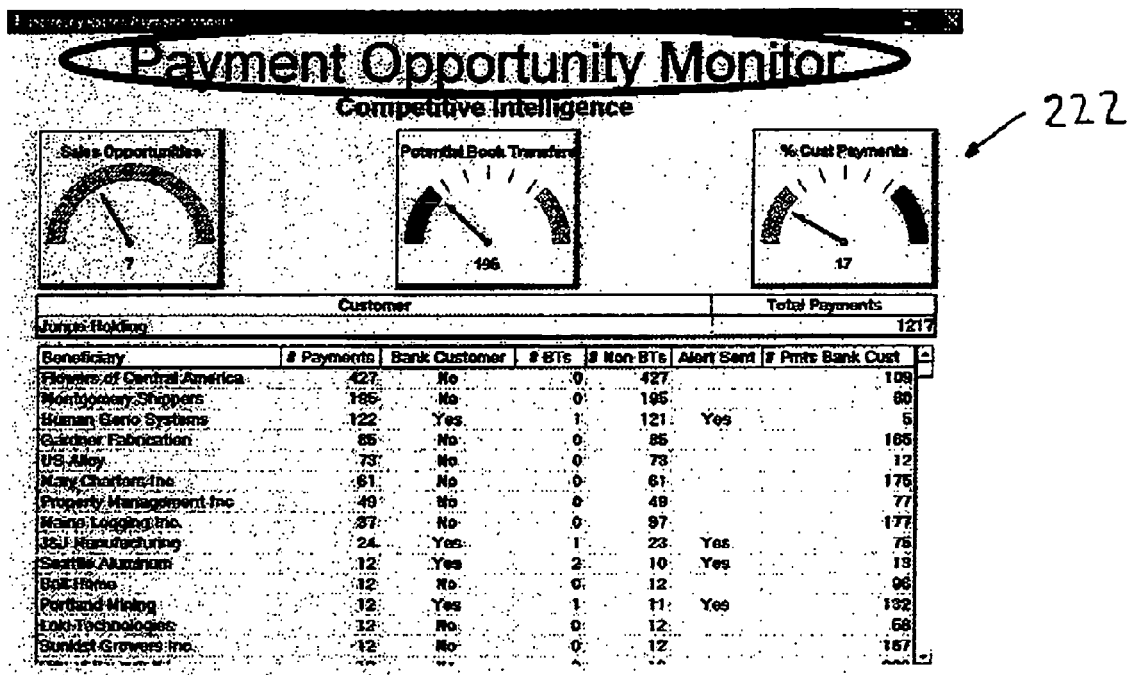
FIG. 9 is an illustration of the Competitive Intelligence Screen of the Payment Opportunity Monitor of the banking system and method of the present invention.

FIG. 9 shows the Competitive Intelligence screen 222 of the Payment Monitor 200, showing the user's customer, Junpo Holding, and a list of the companies it is making payments to—with the recipient of the largest payments appearing at the top of the list. Some of these beneficiaries 108 are customers of the bank 104, while others are not. The gauges 202 at the top of FIG. 9 show the number of highly qualified payments prospects, based on the strong concentration of payment flows from Junpo Holding. The middle gauge 202 shows the number of potential book transfers that can occur if Junpo Holding's payments to bank customers 106 can be kept within the user's bank 104. The gauge on the right of the figure shows the percentage of Junpo Holding's payments that are skipped payments—those that are being sent outside the user's bank 104 to companies that have accounts with the user's bank 104.

In this example, Human Geno Systems is the user's customer 106 and received 122 payments from Junpo Holding. It also received payments from five other customers 106 of the user's bank 104. However, all of the payments from Junpo Holding were sent through other banks 102. Using the Open Payments Target Marketing System 10 would enable the user 104 to identify the other five customers Human Geno receives payments from and work with Human Geno Systems to get these customer payments to go to directly to Human Geno System's accounts with the user 104.

As shown in the figure, Montgomery Shippers is not a customer of the bank 104, but it received 195 payments from Junpo Holding, as well as payments from another 60 of the user's customers 106. It is an excellent candidate to discuss an account relationship with, and the data provided from the Open Payments Target Marketing System 10 will aid the user's sales people in obtaining this business.

Having thus described the invention with particular reference to the preferred forms thereof, it will be obvious that various changes and modifications can be made therein without departing from the spirit and scope of the present invention as defined by the appended claims. For example, the system can be used to provide value in other areas such as securities, foreign exchange, liquidity management, and compliance.

The methodology of the instant invention can be practiced by a user to analyze hundreds of thousands of payment transactions, which in one embodiment could involve transactions between a user's customers 106 in their home country and their business counter-parties located in the euro-zone outside the home country. In such example, the universe for these payment transactions will encompass MT103+ records from the "data extraction start date" back to an earlier date which produces a total of approximately 1 million transactions, which number of records would produce statistically significant results. Such payment transactions would include book transfers, transactions which are initiated or received by correspondent banks 100, as well as transactions that involve user-owned bank intermediaries.

Figure 10:
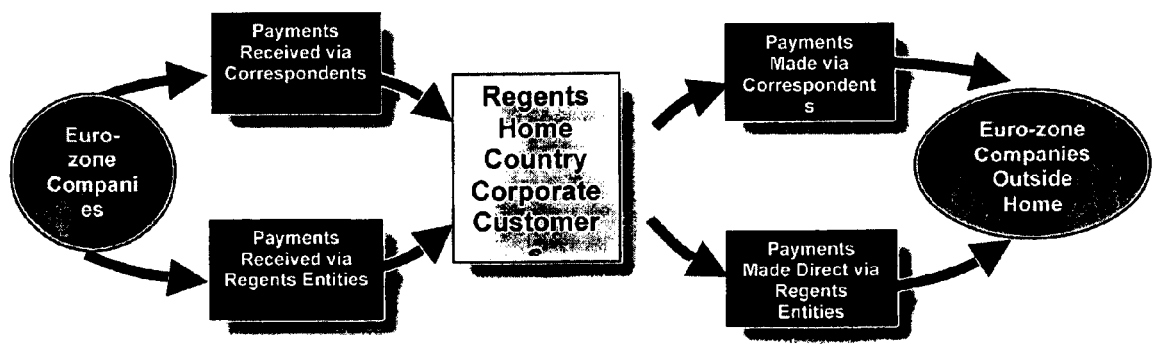
FIG. 10 illustrates the flow of transactions a sample project would capture.

Now referring to FIG. 10, a diagram illustrates the flow of transactions a sample project would capture—in this example where Regents Bank UK is the user:

As FIG. 10 illustrates, the pilot will capture payments for which the:

by order of party (account party) is a company in the euro-zone outside of Regents home country (in this case the UK) that is making a payment to a Regents Bank customer 106 based in the UK—whether through a correspondent 100 or a Regents Bank entity, including "on us" transfers; and beneficiary of the payment from Regents Bank customer 106, based in the home country, is in the euro-zone outside of the home country—whether through a correspondent 100 or a Regents Bank entity, including "on us" transfers.

The data captured using this particular embodiment of the open payments target marketing system 10 of the present invention includes the account party 106, beneficiary 108, paying (by order of) bank(s) or receiving (beneficiary) bank, account information, date, amount, payment mechanism (clearing system, "on us" transfers) and reference number. The analysis of this information will identify the concentration of business opportunities between prospects outside of the home country and Regents Bank customers 106.

For example one high priority prospect in France may be doing business with 500 Regents Bank customers 106-200 of which make payments to the French prospect, 200 of which receive payments from the French prospect and 100 of which both receive and make payments to the French prospect. The analysis will sum up these payments to provide sizing of the opportunity associated with converting this prospect to a Regents Bank customer.

The system and method of the present invention 10 will develop and provide reports for the top 200 prospects that contain the detailed and actionable information Regents Bank requires to develop a comprehensive assessment and sales proposal for these prospects. This report would show the relationship between the prospect and Regents Bank's customers, including the concentration of flows between existing customers and the prospect. In addition to directing the sales efforts to the prospect companies, this information will identify opportunities to leverage well established, and strong, UK customers of Regents Bank 106 who can provide referrals to enhance the chances for a successful relationship acquisition. The top prospect reports will also analyze the impact of converting each prospect to a Regents Bank customer 106 on correspondent bank 100 relations. This analysis will identify the number of payments that will be shifted from each of these correspondent banks to payments made directly through Regents Bank 104.

Figure 11:
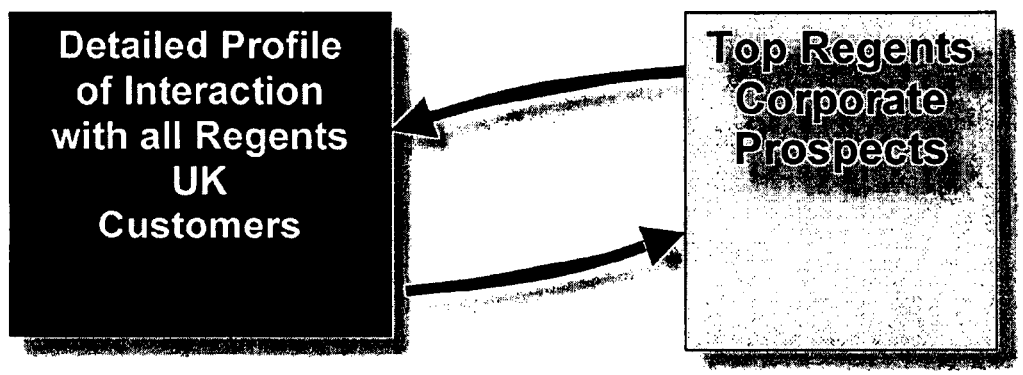
FIG. 11 is a flow chart illustrating data flow to develop a comprehensive assessment and sales proposal for top prospects.

This process is illustrated in FIG. 11.

The analysis would identify the correspondent banks 100 who will lose these payments when the prospect is converted to a Regents Bank client. The analysis will also identify the payments from prospects outside of the UK that are channeled through Regents Bank entities, including book transfers. This analysis will indicate whether Regents Bank already has some market share of these prospects payments business. While they will not be a "new" customer—there may be a substantial opportunity to obtain a larger share of their payments volume. Furthermore, the analysis may identify skipped payments, the situation that arises when a Regents Bank customer makes a payment to a bank in France (for example) when the beneficiary has an account with Regents Bank.

Figure 12:
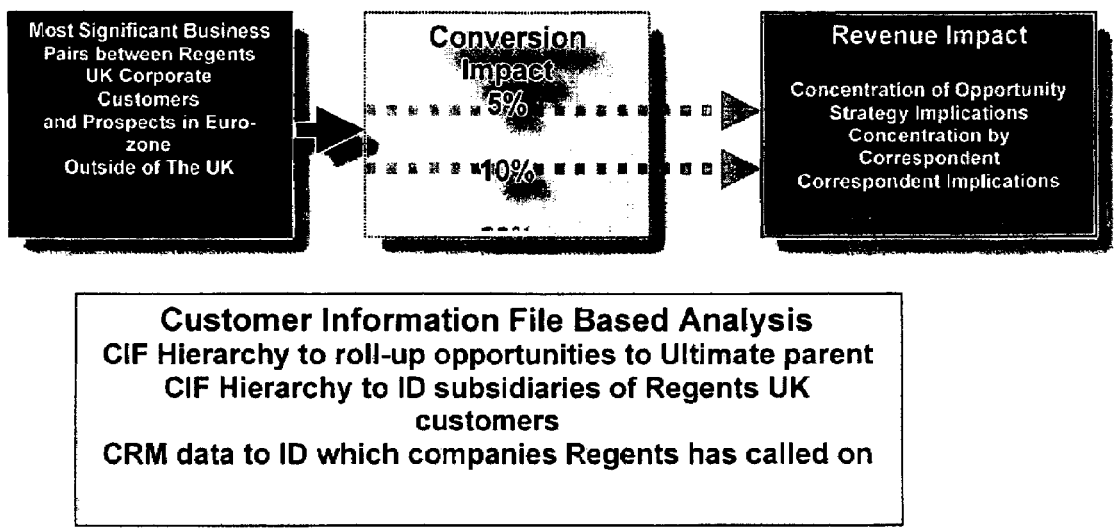
FIG. 12 is a flow chart illustrating the approach to opportunity analysis of the system of the present invention.

Referring now to FIG. 12, a chart is shown that illustrates the approach to opportunity analysis of the system 10 of the present invention.

There are two dimensions to the opportunity analysis—the overall size of the opportunity and the concentration of the opportunity. Realization of the opportunity will be easier if there is a high concentration of payments with a small number of prospects. This will allow Regents Bank to concentrate efforts on converting a couple of hundred prospects and obtain a significant percentage of the overall potential benefit. The opportunity analysis may include a "what-if" approach to sizing the opportunity. For example—if 300 prospects account for 70% of the opportunity, what is the impact of converting various percentages of these prospects to customers.

It is likely that conversion of prospects to clients may exceed the number of payments identified in the analysis since the analysis only shows the number of payments to and from Regents Bank customers. There may be significantly greater payment volumes to other UK customers. There is also the opportunity to get a share of these prospects' payment flows to and from non-UK customers. Regents Bank will have experience with the impact of client acquisitions that will provide an adjustment factor we can incorporate in the analysis. As the diagram shows, there is also the opportunity to enhance this analysis through the merging of Regents Bank's CIF and company hierarchy files with this payment information.

This analysis might indicate that some of these prospects are subsidiaries of Regents Banks clients, in which case existing client relationships can be directly leveraged to gain their subsidiaries' business. CIF information could be associated with Regents Bank's CRM system to determine whether there have been, or are, sales efforts underway with these prospects. The CIF hierarchy file will also provide insight into an associated group of companies has a high concentration of the payment flows to and from the prospect.

In this embodiment, the system 10 can provide the following deliverables to a customer:

Identification, and business opportunity concentration, of prospect companies obtained from analysis of payment records Reports, containing detailed/actionable, information for the top prospects Reports analyzing the implications of prospect business acquisition on the user bank's correspondent banking relationships.

"What-if" analysis to size the market opportunity at various levels of conversion rates, including the corresponding ROI that will be achieved through the implementation of a production system.

Analysis of "split business" between user bank's 104 entities and correspondent banks 100.

Analysis of aggregated payment flows at immediate and ultimate level parent level for subsidiaries of the user's customers 106.

Based on the availability of CIF, and customer hierarchy information

Concentration analysis between prospects and company groups (i.e. consolidated at the ultimate parent level)

Identification of prospects that are subsidiaries (or affiliates) of existing user customers 106

Feasibility assessment of linking the CRM system to priority prospects

It should be appreciated that the Open Payments Target Marketing System of the present invention has a variety of additional applications. For example, it may be used to identify potential new correspondent bank customers 100 who have a significant volume of payment activity between that bank's customer and the user's customers 106. This pattern will identify the top prospects based on volume of payments as well as trend in payment volumes. It will also identify specific customer patterns that are driving existing volumes and trends in volume.

The instant system may also be used to estimate the wallet size of a correspondent bank's 100 payments relative shares by competitors 102 versus the user 104 and to identify customer relationships at risk of significantly declining volumes or lost relationship. Other potential applications include identifying how much business a user is giving to its correspondent bank in relation to the trend in business they are giving the user versus the user's competitors and identifying how a correspondent bank who has a relation with a user is instead sending a payment to a user's customer through an intermediary bank who is the user's competitor.

Additionally, the system 10 can be used to estimate wallet size of a customer payments relative shares by competitors versus the user's, to identify customers who are transferring large amounts of funds to investment vehicles outside the bank and leaving a low overnight balance, to identify potential new customers who have a significant volume of payment activity between a user's customers within the Eurozone but not the home country of the bank, and to identify potential new customers who have a significant volume of payment activity from a user's customers within the Eurozone but not the home country of the bank.

Figure 13:
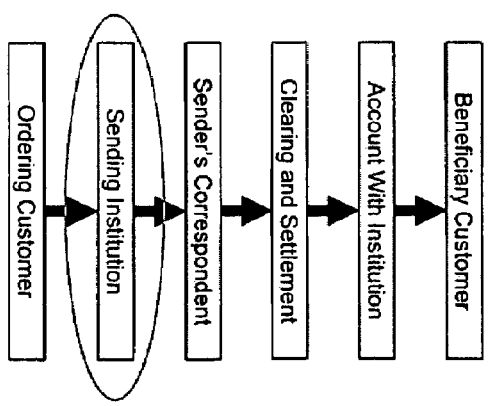
FIG. 13 is a flow chart illustrating the analysis in identifying potential new customers, and identifying specific patterns of conduct.

Other examples of the system's 10 broad applications include identifying potential new customers or expanding a user's customer relationship to customers who have a significant volume of payment activity in one currency but not in another, identifying potential new customers who have a significant volume of payment activity from a user's customers, and identifying patterns of conduct from a customer which may be suspicious when looking at inbound on-us transfers, outbound on-us transfers, inbound not on-us transfer and outbound not on-us transfers. The patterns, analytics and actions associated with these applications are described in FIG. 13; identifying Sending Institutions who are not our customers but would be good candidates to be our customer.

Pattern:

(Based on MT103 fields and the customer information file (CIF))

1. Is the sending institution not a customer?
   Is field 51A not a match to a customer name in our CIF?
   If Yes then Go to Step 2.
   If No. Go to next record.
This step is hereafter called Correspondent_Not_In_CIF
2. Save record to the Correspondent_Banking_New_Business File
   Fields
   32A—Value Date and Amount
   50A—Ordering Customer For each row, compute Cumulative_Percent by adding 180_Day_Percent field to the 180_Day_Percent field on the row above and place in Cumulative_Percent filed.

For each row, take the 30_Day_Data_Count field, divide by the Number_Business_Days_Last_30_Days (Taken from the Investigation System) and store in field Average_Last_30_Days.

For each row, take the 90_Day_Data_Count field, divide by the Number_Business_Days_Last_90_Days (Taken from the Investigation System) and store in field Average_Last_90_Days.

For each row, take the 180_Day Data_Count field, divide by the Number_Business Days_Last_180_Days (Taken from the Investigation System) and store in field Average_Last_180_Days.

For each row, take the 365_Day_Data_Count field, divide by the Number_Business_Days_Last_365_Days (Taken from the Investigation System) and store in field Average_Last_365_Days.

| Ordering Institution | Total Volume Last 180 Days | 180 Day % of Total | Cumulative % of Total | Average Last 30 Days | Average Last 90 Days | Average Last 180 Days | Average Last 365 Days |
|---|---|---|---|---|---|---|---|
| Bank A | 100,000 | 62% | 62% | 506 | 505 | 556 | 580 |
| Bank B | 39,000 | 24% | 86% | 211 | 225 | 217 | 200 |
| Bank C | 21,000 | 13% | 99% | 140 | 120 | 117 | 115 |
| Bank D | 2,300 | 1% | 100% | 9 | 14 | 13 | 10 |
| Total | 162,300 | | | | | | |

51A—Sending Institution
52A—Ordering Institution
53A—Senders Correspondent
56A—Intermediary Institution
59A—Beneficiary 108 Customer Analytics:

Ranking Order for Highest Potential New Customer based on Volume of Payments. Will aggregate the number of payments by Sending Institution and show historical trends.

Action:
  Sort Correspondent_Banking_New_Business File by 51A
  Tally Data
    If value date minus the current date is less than 30 days, count the number of payments and store in 30_Day_Data_Count field.
    If value date minus the current date is less than 90 days, count the number of payments and store in 90_Day_Data_Count field.
    If value date minus the current date is less than 180 days, count the number of payments and store in 180_Day_Data_Count field.
    If value date minus the current date is less than 365 days, count the number of payments and store in 365_Day_Data_Count field.
  (Here after called Tally_Data_Date_30_90_180_365)
  Sum 180_Day_Data_Count field for all 51A and store in a 180_Day_Total_Payments field.
  Divide each unique 51A 180_Day_Data_Count field by 180_Day_Total_Payments to derive percent of total by each sending institution and store in 180_Day_Percent field.
  Sort row by Descending based on 180_Day_Count field.

Figure 14:
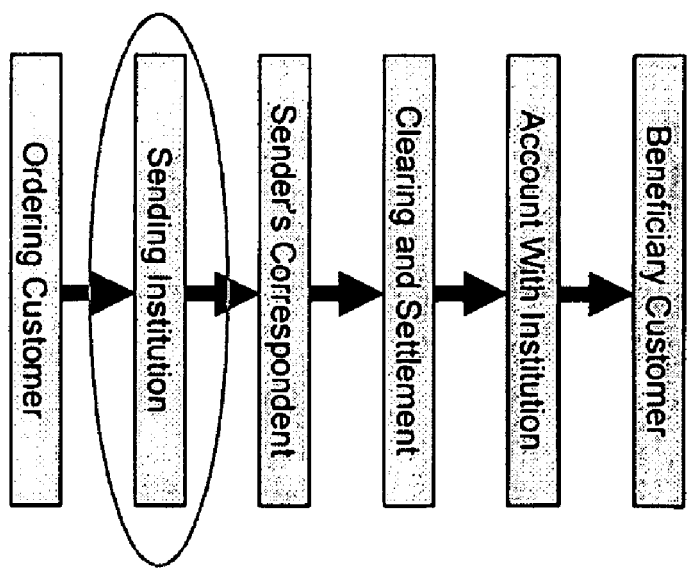
FIG. 14 is a flow chart illustrating a method to determine the size of the wallet of our correspondent and what percentage of their business does it appear we are getting.

Referring now to FIG. 14, a method is shown to determine the size of the wallet of our correspondent and what percentage of their business does it appear we are getting:

Pattern:

(Based on MT103 fields and the customer information file)

1. Is the sending institution an existing customer?
   Is field 51A=customer in our CIF?
   If Yes Go to Step 2.
   If No. Go to next record.
This step is hereafter called Correspondent_In_CIF
2. Is the Sender's Correspondent one of our competitors (from specified list supplied by bank)?
   Is field 53A is on the Competitor_List?
   if yes include go to step 3.
   if no, move to next record
3. Save record to Correspondent_Banking_Wallet_Sizing file
   Fields
   32A—Value Date and Amount
   50A—Ordering Customer
   51A—Sending Institution
   52A—Ordering Institution
   53A—Senders Correspondent
   56A—Intermediary Institution
   59A—Beneficiary 108 Customer Analytics:

Identify the commercial payment volume percentage for each competitor who sends payments to us on behalf a correspondent bank who is our customer.

Action:
  Get our bank's market share from Clearing and Settlement Entity (e.g., fedwire, TCH, EBA, ECB, LVTS) and store in Market_Share field.
  Take records in the Correspondent_Banking_Wallet_Sizing file and sort by 51A (Sending_Institution)
  Tally_Data_Date__30__90__180__365
  Use 30_Day_Data_Count for each Sending_Institution and array by institution in the Competitor_List to form the Sending_Insitution_By_Competitor__30_Day field.
  Populate Competitor_Volume__30_Day field by dividing the Sending_Insitution_By_Competitor__30_Day field by the Market_Share field for each competitor.
  For each Sending_Institution list our Debit_Volume for that institution over the past 30 days (taken from the bank's wire transfer system) and populate the Debit_Volume_By_Sending_Institution__30_Day field.
  For each Sending_Institution_sum the Competitor_Volume__30_Day for each competitor and Debit_Volume_By_Sending_Institution__30_Day and place in a Total_Volume__30_Day field.
  For each Sending_Institution compute Competitor_Market_Share by taking Competitor_Volume__30_Day and dividing it by the Total_Volume__30_Day and populate in the Competitor_Market_Share__30_Day field.

56A—Intermediary Institution
59A—Beneficiary 108 Customer

Analytics:
Identify what percentage each of our competitors has of our correspondent bank's commercial payment volume and who is trending up or down.

Action:
  Take records in the Business_At_Risk file and sort by 51A (Sending_Institution).
  Tally Data 30, 90, 180 days
    If value date minus the current date is less than 30 days, count the number of payments and store in 30_Day_Data_Count field.
    If value date minus the current date is less than 90 days, count the number of payments and store in 90_Day_Data_Count field.
    If value date minus the current date is less than 180 days but greater than 90 days count the number of payments and store in 90__180_Day_Data_Count field. (Here after called Tally_Data_Date__30__90__90__180)
  Use 30_Day_Data_Count for each Sending_Institution and array by institution in the Competitor_List to form the Sending_Insitution_By_Competitor__30_Day field.
  Use 90_Day_Data_Count for each Sending_Institution and array by institution in the Competitor_List to form the Sending_Insitution_By_Competitor__90_Day field.

| For last 30 days | Competitor 1 | | Competitor 2 | | Competitor 3 | | Competitor 4 | | | |
|---|---|---|---|---|---|---|---|---|---|---|
| Sending Institution | volume | % share | volume | % share | volume | % share | volume | % share | Debit Volume of our MT103 | Total |
| Bank A | 25,000 | 11% | 35,000 | 15% | 10,000 | 4% | 60,000 | 26% | 100,000 | 230,000 |
| Bank B | | | | | | | | | | |
| Bank C | | | | | | | | | | |
| Bank D | | | | | | | | | | |
| Market Share | 20% | | | | | | | | | |

3. Correspondent Banking: Threshold-Driven "Business at Risk" Warning System

Figure 15:
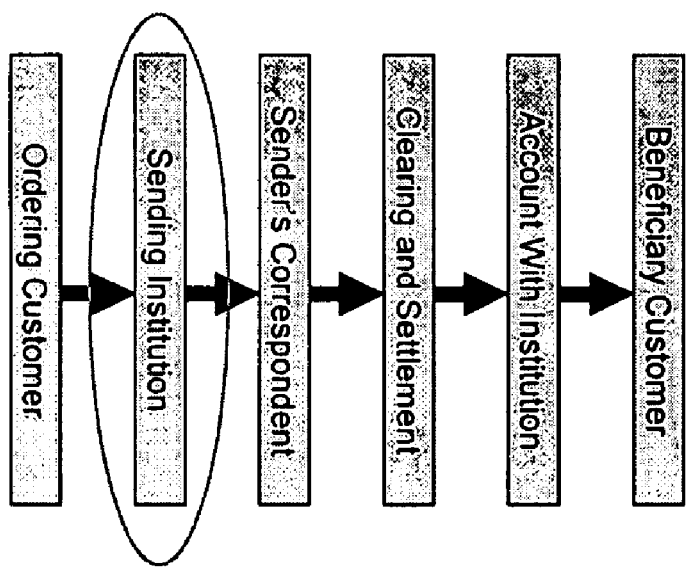
FIG. 15, is a flow chart illustrating a method to identify significantly decreased volume to our bank from a specific sending institution while our correspondent banks are not seeing similar reductions in volume.

Referring now to FIG. 15, a method is shown to identify significantly decreased volume to our bank from a specific sending institution while our correspondent banks are not seeing similar reductions in volume:

Pattern:
(Based on MT103 fields and the customer information file)

1. Is the sending institution an existing customer?
  Correspondent_In_CIF?
  If Yes Go to Step 2.
  If No. Go to next record.

2. Is the Sender's Correspondent one of our competitors (from specified list supplied by bank)?
  Is field 53A is on the Competitor_List?
  if yes include go to step 3.
  if no, move to next record 3. Save record in Business_At_Risk file
  Fields
  32A—Value Date and Amount
  50A—Ordering Customer
  51A—Sending Institution
  52A—Ordering Institution
  53A—Senders Correspondent Use 180_Day_Data_Count for each Sending_Institution and array by institution in the Competitor_List to form the Sending_Insitution_By_Competitor__180_Day field.

For each Sending_Institution list our Debit_Volume for that institution over the past 30 days (taken from the bank's wire transfer system) and populate the Debit_Volume_By_Sending_Institution__30_Day field.

For each Sending_Institution list our Debit_Volume for that institution over the past 90 days (taken from the bank's wire transfer system) and populate the Debit_Volume_By_Sending_Institution__90_Day field.

For each Sending_Institution list our Debit_Volume for that institution over the past 91-180 days (taken from the bank's wire transfer system) and populate the Debit_Volume_By_Sending_Institution__180 Day field.

For each Sending_Institution sum the Competitor_Volume__30_Day for each competitor and Debit_Volume_By_Sending_Institution__30_Day and place in a Total_Volume__30_Day field.

For each Sending_Institution sum the Competitor_Volume__90_Day for each competitor and Debit_Volume_By_Sending_Institution__90_Day and place in a Total_Volume__90_Day field.

For each Sending_Institution sum the Competitor_Volume_180_Day for each competitor and Debit_Volume_By_Sending_Institution_180_Day and place in a Total_Volume_180_Day field.

For each Sending_Institution compute Competitor_Market_Share by taking Competitor_Volume_30_Day and dividing it by the Total_Volume_30_Day and populate in the Competitor_Market_Share_30_Day field.

For each Sending_Institution compute Competitor_Market_Share by taking Competitor_Volume_90_Day and dividing it by the Total_Volume_90_Day and populate in the Competitor_Market_Share_90_Day field.

For each Sending_Institution compute Competitor_Market_Share by taking Competitor_Volume_180_Day and dividing it by the Total_Volume_180_Day and populate in the Competitor_Market_Share_180_Day field.

For each Sending_Institution compute Our Market_Share by taking Debit_Volume_By_Sending_Institution_30_Day and dividing it by the Total_Volume_30_Day and populate in the Our_Market_Share_30_Day field.

For each Sending_Institution compute Our_Market_Share by taking Debit_Volume_By_Sending_Institution_90_Day and dividing it by the Total_Volume_90_Day and populate in the Our_Market_Share_90_Day field.

For each Sending_Institution compute Our_Market_Share by taking Debit_Volume_By_Sending_Institution_180_Day and dividing it by the Total_Volume_180_Day and populate in the Our_Market_Share_180_Day field.

Highlight changes in Competitor_Market_Share_30_Day and Competitor_Market_Share_90_Day where Competitor_Market_Share_30_Day minus Competitor_Market_Share_90_Day is greater than Threshold_Amount. (Manual input).

Highlight changes in Competitor_Market_Share_90_Day and Competitor_Market_Share_180_Day where Competitor_Market_Share_90_Day minus Competitor_Market_Share_180_Day is greater than Threshold_Amount. (Manual input).

Highlight changes in Our_Market_Share_30_Day and Our_Market_Share_90_Day where Our_Market_Share_90_Day minus Our_Market_Share_30_Day is greater than Threshold_Amount. (Manual input).

Highlight changes in Our_Market_Share_90_Day and Our_Market_Share_180 Day where Our_Market_Share_180_Day minus Our_Market_Share_90_Day is greater than Threshold_Amount. (Manual input).

4. Correspondent Banking: Reciprocity Analyzer

Figure 16:
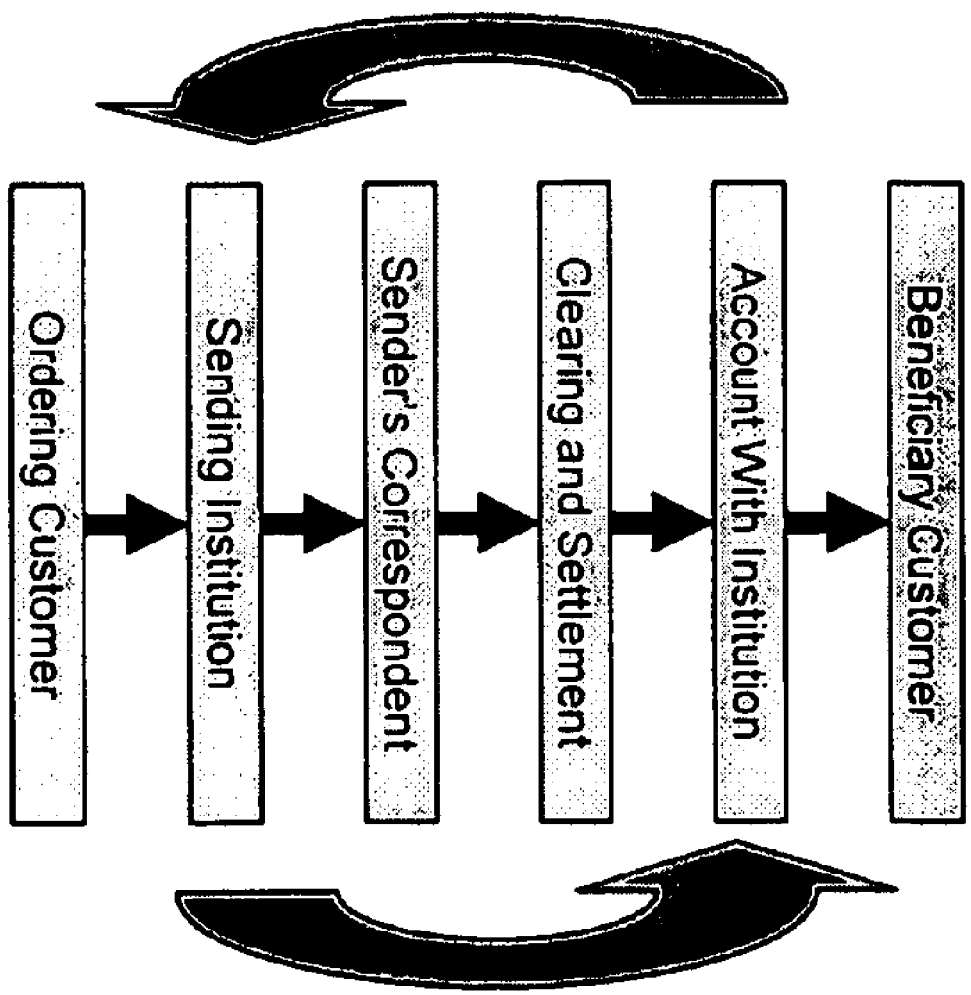
FIG. 16, is a flow chart illustrating a method to ensure that our level of business stays reciprocal with our correspondents' level of business with us.

Referring now to FIG. 16, a method is shown to ensure that our level of business stays reciprocal with our correspondents' level of business with us:

Pattern:

(Based on MT103 fields and the customer information file)

1. Is the sending institution an existing customer?
   Correspondent_In_CIF?
   If Yes Go to Step 2.
   If No. Go to next record.

2. Is the Sending Institution in our Nostro_Account database?
   Is field 51A=Nostro_Account_Bank (take from corporate list of Nostro Banks)
   If no move to next record
   If yes move to step 3

3. Is the Sending Institution from the country we are analyzing?
   Input Search_County_Code
   Look at 51A for BIC
   Cross ref to CIF for BIC to Country_Code
   Does Country_Code match Search_Country_Code
   If no move to next record
   If yes include send file to Reciprocity_Analyzer file 4. Save record to Reciprocity_Analyzer Database
   Fields
   32A—Value Date and Amount
   50A—Ordering Customer
   51A—Sending Institution
   52A—Ordering Institution
   53A—Senders Correspondent
   56A—Intermediary Institution
   59A—Beneficiary 108 Customer Analytics:

Identify trends where the correspondent is sending a Payment Message through a correspondent.

Action:

Take records in the Reciprocity_Analyzer file and sort by 51A (Sending_Institution).

Tally_Data_Date_30_90_90_180 and array.

For each row, take the 30_Day_Data_Count field, divide by the Number_Business_Days_Last_30_Days (Taken from the Investigation System) and store in field Average_Last_30_Days.

| For last 30 days Ordering Institution | Competitor 1 volume | Competitor 2 volume | Competitor 3 volume | Competitor 4 volume | Debit Volume of our MT103 | Total |
|---|---|---|---|---|---|---|
| Bank A 30 Days | 3,000 | 5,000 | 2,000 | 9,000 | 10,000 | 29,000 |
| Bank A last 90 Days | 8,000 | 14,000 | 6,500 | 26,000 | 32,000 | 86,500 |
| Bank A 90-180 | 8,200 | 13,000 | 6,300 | 12,000 | 45,000 | 84,500 |
| Bank A 30 Days | 10% | 17% | 7% | 31% | 34% | |
| Bank A last 90 Days | 9% | 16% | 8% | 30% | 37% | |
| Bank A 90-180 | 10% | 15% | 7% | 14% | 53% | |

For each row, take the 90_Day_Data_Count field, divide by the Number_Business_Days_Last_90 Days (Taken from the Investigation System) and store in field Average_Last_90_Days.

For each row, take the 90_180_Day_Data_Count field, divide by the Number_Business_Days_Last_180_Days minus Number_Business_Days_Last_90_Days (Taken from the Investigation System) and store in field Average_Last_90_180_Days.

For each Nostro_Account_Bank list our Debit_Volume for that institution over the past 30 days (taken from the bank's wire transfer system) and populate the Debit_Volume_By_Sending_Institution_30_Day field.

For each Nostro_Account_Bank list our Debit_Volume for that institution over the past 90 days (taken from the bank's wire transfer system) and populate the Debit_Volume_By_Sending_Institution_90_Day field.

For each Nostro_Account_Bank list our Debit_Volume for that institution over the past 91-180 days (taken from the bank's wire transfer system) and populate the Debit_Volume_By_Sending_Institution_180_Day field.

For each row, take the Debit_Volume_By_Sending_Institution_30_Day, divide by the Number_Business_Days_Last_30_Days (Taken from the Investigation System) and store in field Debit_Volume_Average_Last_30_Days.

For each row, take the Debit_Volume_By_Sending_Institution_90_Day, divide by the Number_Business_Days_Last_90_Days (Taken from the Investigation System) and store in field Debit_Volume_Average_Last_90_Days.

For each row, take the Debit_Volume_By_Sending_Institution_90_180_Day, divide by the Number_Business_Days_Last_90_180_Days (Taken from the Investigation System) and store in field Debit_Volume_Average_Last_90_180_Days.

For each row take the Debit_Volume_Average_Last_30_Days and divide it by the Average_Last_30_Days to compute the Reciprocity_30 field.

For each row take the Debit_Volume_Average_Last_90_Days and divide it by the Average_Last_90_Days to compute the Reciprocity_90 field.

For each row take the Debit_Volume_Average_Last_90_180_Days and divide it by the Average_Last_90_180_Days to compute the Reciprocity_180 field.

8. Corporate Banking: Competitive Wallet Share Analyzer

Pattern:

(Based on MT103 fields and the customer information file)

1. Is the Ordering Customer an existing customer?
   Is field 50A=customer in our CIF?
   If Yes Go to Step 2.
   If No. Go to next record.

2. Is the Sending Institution one of our competitors (from specified list)?
   Is field 51A on list?
   if no, move to next record
   if yes include in Corporate Banking: Competitive Wallet Share Analyzer file 3. Save record to Database
   Fields
   32A—Value Date and Amount
   50A—Ordering Customer
   51A—Sending Institution
   59A—Beneficiary 108 Customer Analytics:

Identify what percentage each of our customers is sending through other banks rather than through us.

Action:
   Sort by descending order of MT103s for debit (payments we initiate) and credit (payments we receive) based on field 50A
   Sort by field 51A (Sending Correspondent)
   If value date minus the current date is less than 30 days, count the number of payments
   If value date minus the current date is less than 90 days, count the number of payments
   If value date minus the current date is less than 180 days, count the number of payments
   If value date minus the current date is less than 365 days, count the number of payments
   Divide each 50A-51A pairing by our estimated market share to approximate total market volume

|  | Average 30 Days | Debit 30 Days | Average 90 Days | Debit 90 Days | Average 180 Days | Debit 180 Days | Reciprocity 30 | Reciprocity 60 | Reciprocity 180 |
|---|---|---|---|---|---|---|---|---|---|
| Nostro Account Bank A | 5,000 | 6,000 | 5,500 | 6,100 | 6,000 | 6,250 | 1.2000 | 1.1091 | 1.0417 |
| Nostro Account Bank B | 2,000 | 2,500 | 2,800 | 3,300 | 1,800 | 2,200 | 1.2500 | 1.1786 | 1.2222 |
| Nostro Account Bank C | 1,000 | 1,300 | 900 | 900 | 1,200 | 1,100 | 1.3000 | 1.0000 | 0.9167 |

| For last 30 days | Competitor 1 volume | % share | Competitor 2 volume | % share | Competitor 3 volume | % share | Competitor 4 volume | % share | Debit Volume of our MT103 | Total |
|---|---|---|---|---|---|---|---|---|---|---|
| Customer A | 2,000 | 20% | 3,500 | 35% | 1,000 | 10% | 600 | 6% | 3,000 | 10,100 |
| Customer B | 1,750 | 28% | 750 | 12% | 700 | 11% | 500 | 8% | 2,600 | 6,300 |
| Customer C | 1,250 | 21% | 1,000 | 17% | 600 | 10% | 625 | 11% | 2,380 | 5,855 |
| Customer D | 250 | 7% | 600 | 16% | 600 | 16% | 1,150 | 31% | 1,054 | 3,654 |
| Market Share | 20% | | | | | | | | | |

9. Corporate Banking: End of Day Liquidity Retention Targeting System

Pattern:

(Based on MT103 fields and the customer information file)

Define Significant_Transfer_Amount

1. Is the outbound payment greater than Significant_Transfer_Amount?
   Is 32A>Significant_Transfer_Amount?
   If Yes Go to Step 2.
   If No. Go to next record.

2. Is it Near_End_Of_Day?
   Is the time stamp after Near_End_Of_Day (field 13C)?
   if no, move to next record
   if yes include in End of Day Liquidity Retention file 3. Save record to Database
   Fields
   32A—Value Date and Amount
   50A—Ordering Customer
   59A—Beneficiary 108 Customer Analytics:

To identify large payments at end of day to top beneficiaries 108 with a high percentage of transaction volume and $ value Action:
   Aggregate Value for each 50A
   Is end of day balance for 50A from DDA less than Retention_Target % of aggregated total?
   No—move to next customer
   Yes Flag records.
   Add up number of customers and beni
   Review information in DB for last 30 days
   List by 50A where 59A is greater than 20% of number transaction and value (field 32A) is greater than 20% of total.
   Rank order by 50A-59A pair with highest transaction value.

10. Corporate Banking: SEPA Inbound Opportunity identification and Targeting System Pattern:

(Based on MT103 fields and the customer information file)

1. Is the Ordering Customer not an existing customer?
   Is field 50A=not customer in our CIF?
   If No then go to next record.
   If yes. Go to step 2.
   DEFINE HOME COUNTRY and EUROZONE 2. Is the country code outside the home country?
   Is field 50A is not equal to home country?
   If no, go to next record
   If yes, go to step 3.

3. Is the country code a Euro Zone county?
   Is field 50A=Eurozone country?
   If yes to go step 4.
   If no to go next record.

4. Save record to SEPA_Inbound file
   Fields
   32A—Value Date and Amount
   50A—Ordering Customer
   51A—Sending Institution
   52A—Ordering Institution
   53A—Senders Correspondent
   56A—Intermediary Institution
   59A—Beneficiary 108 Customer Analytics:

Ranking Order for Highest Potential New Customer based on Volume of Payments. Will aggregate the number of payments by Ordering Customer.

Action:
   Sort by 50A
   If value date minus the current date is less than 90 days count the number of payments (from field 32A)

| | Investment Manager 1 | Investment Manager 2 | Investment Manager 3 | Investment Manager 4 | Investment Other | Total |
|---|---|---|---|---|---|---|
| Customer A | 2,000 | 1,000 | 500 | 200 | 200 | 3,900 |
| Customer B | 800 | 1,200 | 600 | 400 | 300 | 3,300 |
| Customer C | 600 | 800 | 1,000 | 300 | 500 | 3,200 |

* in millions

Take number of payment by each 50A and divide by total number of payments in file to derive % of total by each Ordering Customer.
Show cumulative % of total for top 2, 3, 4, 5 etc.

| Ordering Customer | Total number of payments 90 days | % of Total | Cumulative % of Total |
|---|---|---|---|
| Prospect A | 5,800 | 7% | 7% |
| Prospect B | 3,500 | 4% | 11% |
| Prospect C | 2,500 | 3% | 14% |
| Prospect D | 2,200 | 3% | 16% |
| Total Payment | 85,000 | | |

10. Corporate Banking: SEPA Outbound Opportunity identification and Targeting System Pattern:

(Based on MT103 fields and the customer information file)

All the Same Changes

1. Is the Beneficiary 108 Customer an existing customer?
   Is field 59A=customer in our CIF?
   If Yes then go to next record.
   If No. Go to step 2.

2. Is the country code the home country?
   Is field 59A=to home country?
   If yes, go to next record
   If no, go to step 3.

3. Is the country code a Euro Zone county?
   Is field 59A=Eurozone country?
   If yes to go step 4.
   If no to go next record.

4. Save record to Database
   Fields
   32A—Value Date and Amount
   50A—Ordering Customer
   51A—Sending Institution
   52A—Ordering Institution
   53A—Senders Correspondent
   56A—Intermediary Institution
   59A—Beneficiary 108 Customer Analytics:

Ranking Order for Highest Potential New Customer based on Volume of Payments. Will aggregate the number of payments by Beneficiary 108 Customer.

Action:
   Sort by 59A
   If value date minus the current date is less than 90 days count the number of payments (from field 32A)
   Take number of payment by each 59A and divide by total number of payments from top 100 to derive % of total by each beneficiary 108.
   Show cumulative % of total for top 2, 3, 4, 5 etc.

| Benificiary Customer | Total number of payments 90 days | % of Total | Cumulative % of Total |
|---|---|---|---|
| Prospect A | 6,800 | 6% | 6% |
| Prospect B | 5,700 | 5% | 12% |
| Prospect C | 3,400 | 3% | 15% |
| Prospect D | 3,100 | 3% | 18% |
| Total top 100 | 105,000 | | |

11. Corporate Banking: Cross Currency Opportunity Identification and Targeting System Pattern:

(Based on MT103 fields and the customer information file)

1. On an outbound payment list top 10% of payment customers by currency. CLEAN

2. Is the Company, Parent, or Ultimate Parent a Target_Country based company from the CIF?
   If No, go to next record.
   If yes go to step 3.

SELECT CURRENCY

3. Go to Mapping # "8 Corporate Banking: Competitive Wallet Share Analyzer".

12. Corporate Banking: Network Opportunity Identification and Targeting Systems

Pattern:

(Based on MT103 fields and the customer information file)

1. Is the Beneficiary 108 Customer an existing customer?
   Is field 59A=customer in our CIF?
   If Yes then go to next record.
   If No. Go to step 2.

2. Save record to Database
   Fields
   32A—Value Date and Amount
   50A—Ordering Customer
   51A—Sending Institution
   52A—Ordering Institution
   53A—Senders Correspondent
   56A—Intermediary Institution
   57A—Account With Institution
   59A—Beneficiary 108 Customer Analytics:

Ranking Order for Highest Potential New Customer based on Volume of Payments. Will aggregate the number of payments by Beneficiary 108 Customer.

Action:
   Sort by 59A
   If value date minus the current date is less than 90 days count the number of payments (from field 32A)
   Take number of payment by each 59A and divide by total number of payments from top 100 to derive % of total by each beneficiary 108.
   Show cumulative % of total for top 2, 3, 4, 5 etc.

| Benificiary Customer | Total number of payments 90 days | % of Total | Cumulative % of Total |
|---|---|---|---|
| Prospect A | 11,005 | 5% | 5% |
| Prospect B | 8,025 | 4% | 9% |

-continued

| Benificiary Customer | Total number of payments 90 days | % of Total | Cumulative % of Total |
|---|---|---|---|
| Prospect C | 7,800 | 4% | 13% |
| Prospect D | 5,800 | 3% | 16% |
| Total top 100 | 205,000 | | |

Sort by 50A (Ordering Party) to show relationship between Ordering Customer and Beneficiary 108 Customer.

| Benificiary Customer | Total number of payments 90 days from a specfic Ordering Customer | % of Total | Cumulative % of Total |
|---|---|---|---|
| Prospect A | 650 | 7% | 7% |
| Prospect B | 520 | 5% | 12% |
| Prospect C | 310 | 3% | 15% |
| Prospect D | 295 | 3% | 18% |
| Total top 100 | 9,800 | | |

13. Compliance: Suspicious Payment Pattern Monitoring and Analysis System

Pattern:

(Based on MT103 fields and the customer information file)

Inbound:

Identify High Risk Customers
   Does 59A match against bank provided list?
   If no go to next record.
   If yes Save Record to Database.

Outbound:

Identify High Risk Customers
   Does 50A match against bank provided list
   If no go to next record.
   If yes Save Record to Database.

Save record to Database
   Fields
     32A—Value Date and Amount
     50A—Ordering Customer
     51A—Sending Institution
     52A—Ordering Institution
     53A—Senders Correspondent
     54A—Receivers Correspondent
     56A—Intermediary Institution
     57A—Account With Institution
     59A—Beneficiary 108 Customer Analytics:

Identify when transaction is between our high-risk customer and another high-risk customer.

Action:
   Are 50A and 59A both high-risk customers

Analytics:

Do specific incoming payment match within 5% of outbound payments same day.

Action:
   Look up 32 for value in inbound same day
   Look up 32 for value in outbound same day
   Compare to +−5%.
   If outside 5% no action taken
   If inside 5% flag and move to Suspicious Database.
Match 50A, 59A pairs and aggregate number of transactions to identify patterns

What is claimed is:

1. An automated banking system for identifying and analyzing payment related information between a user's correspondent banks, customers and competitors, and acting upon said information, said system comprising:
means for identifying incoming payments said correspondent banks route through said competitors;
means to capture incoming payment information, wherein said incoming payment information includes the correspondent bank from which said incoming payment originated, the competitor through which said payment was sent, the correspondent bank's customer, the payment beneficiary or customer, and all payment identification information associated with said payment;
means for analyzing said incoming payment information; and
activating means for communicating said analysis to said user.

2. The automated banking system of claim 1, further including means to generate an advisory message to said correspondent bank informing said correspondent bank that said payment may be made directly from their account.

3. The automated banking system of claim 1, further including means for generating a report of said indirectly routed payments.

4. The automated banking system of claim 1, wherein said means for identifying, capturing and analyzing payment information are all performed on a real-time or near-real-time basis.

5. The automated banking system of claim 1, wherein means for capturing payment information comprises a commercially available payments solution framework.

6. The system of claim 1 further including the step of: identifying potential new customers or expanding a user's customer relationship to customers who have a predetermined volume of payment activity in one currency but not in another.

7. The system of claim 1 further including the step of: identifying potential new customers who have a significant volume of payment activity from a user's existing customers.

8. The system of claim 1 further including the step of: identifying specific patterns of conduct from a customer when analyzing data from any one of inbound on-us transfers, outbound on-us transfers, inbound not on-us transfers and outbound not on-us transfers; and communicating an alarm to said user.

9. An automated banking system for identifying and analyzing payment related information between a user's correspondent banks, customers and competitors, and acting upon said information on a real-time or near-real-time basis, said system comprising:
means for identifying incoming payments said correspondent banks route through said competitors;
means to capture incoming payment information, wherein said incoming payment information includes the correspondent bank from which said incoming payment originated, the competitor through which said payment was sent, the correspondent bank's customer, the payment beneficiary or customer, and all payment identification information associated with said payment, said means to capture comprising a commercially available payments solution framework;

means for analyzing said incoming payment information;
means to generate an advisory message to said correspondent bank informing said correspondent bank that said payment may be made directly from their account; and
means for generating a report of said indirectly routed payments.

* * * * *